INVENTOR
W. R. Elkins

March 19, 1957 W. R. ELKINS 2,785,468
DEVICE FOR THE MEASUREMENT OF IRREGULAR AREAS
Filed Nov. 23, 1955 4 Sheets-Sheet 2

INVENTOR
W.R. Elkins
BY
Mason, Fenwick & Lawrence
ATTORNEYS

March 19, 1957 W. R. ELKINS 2,785,468
DEVICE FOR THE MEASUREMENT OF IRREGULAR AREAS
Filed Nov. 23, 1955 4 Sheets-Sheet 3
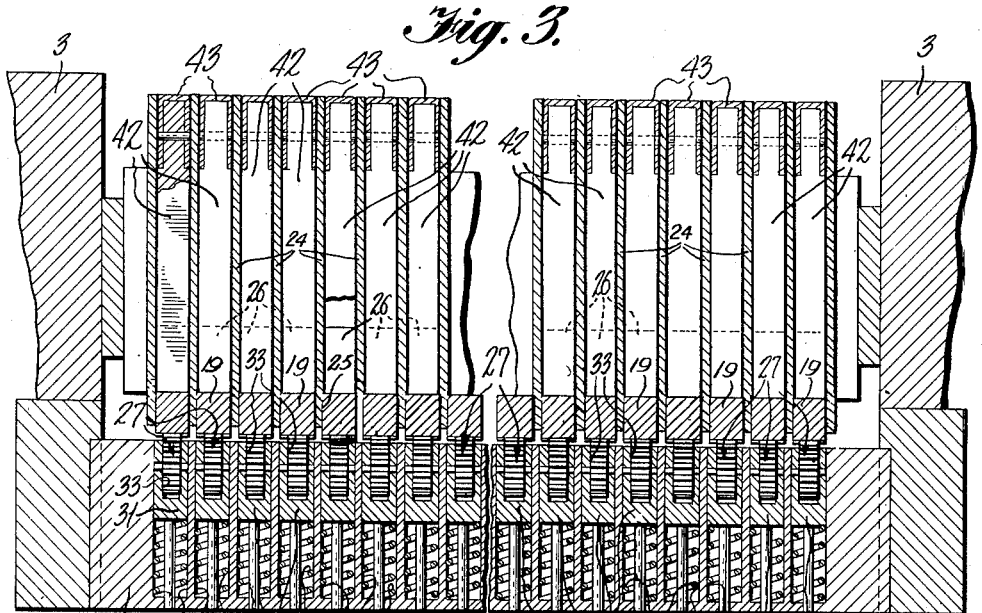
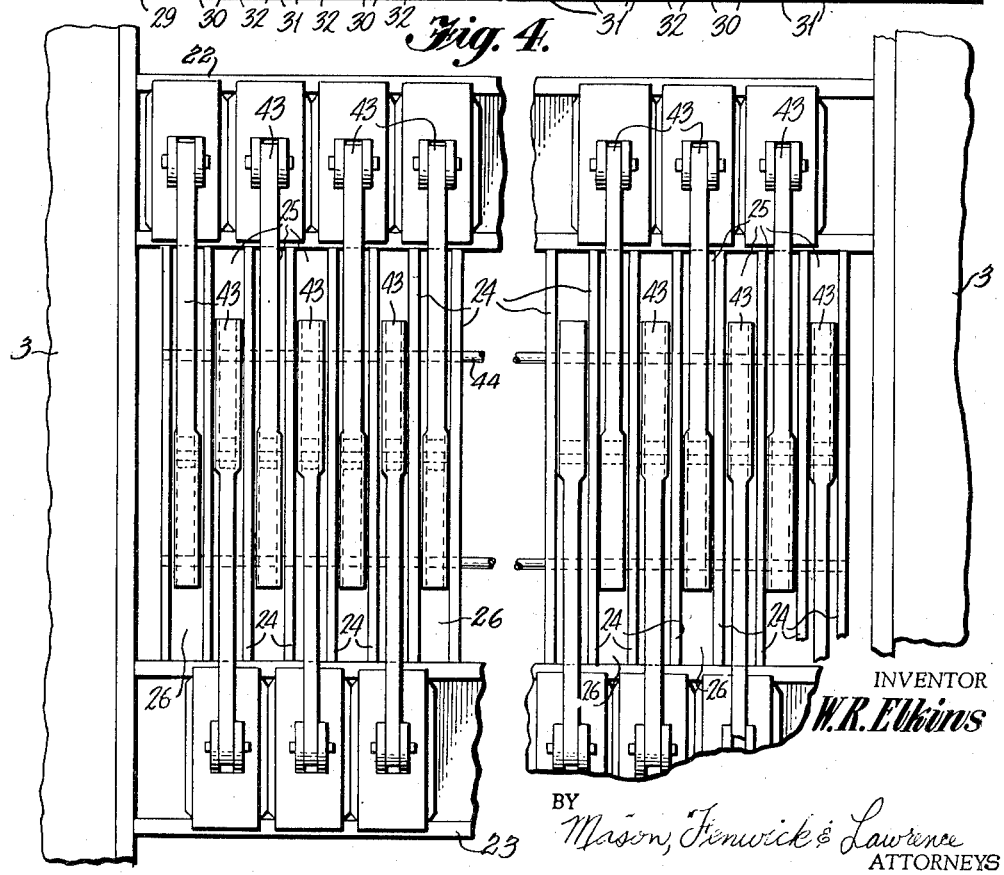
INVENTOR
W. R. Elkins
BY
Mason, Fenwick & Lawrence
ATTORNEYS March 19, 1957 W. R. ELKINS 2,785,468
DEVICE FOR THE MEASUREMENT OF IRREGULAR AREAS
Filed Nov. 23, 1955 4 Sheets-Sheet 4
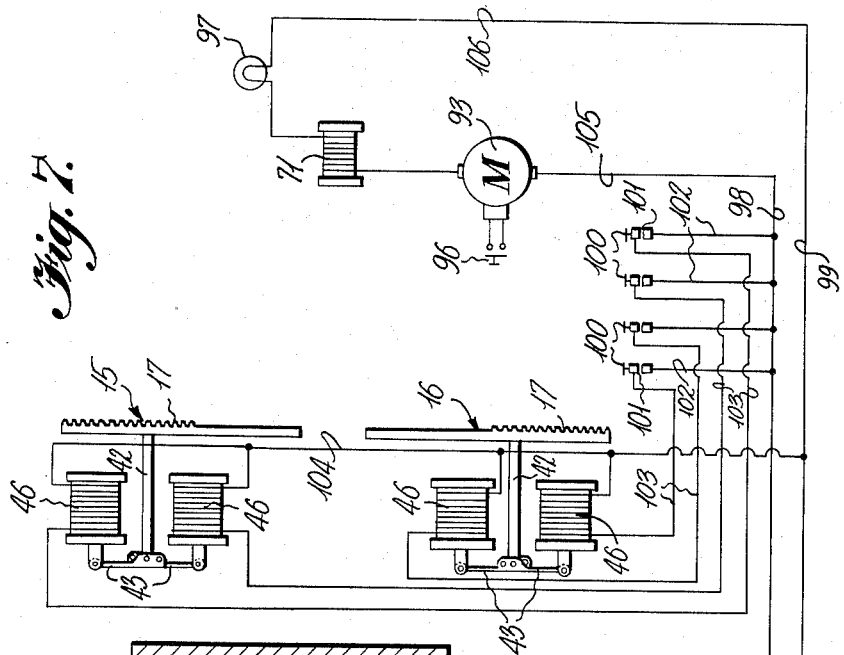
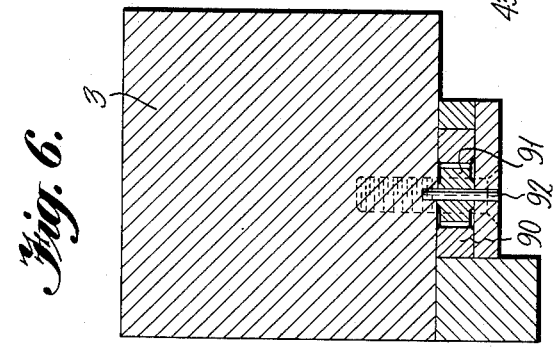
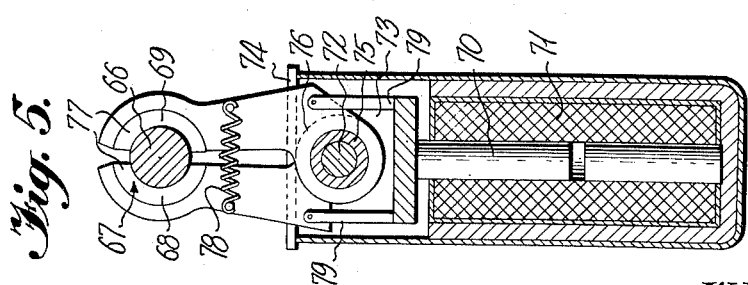
INVENTOR
W. R. Elkins
BY Mason, Fenwick & Lawrence
ATTORNEYS

United States Patent Office 2,785,468
Patented Mar. 19, 1957

2,785,468

DEVICE FOR THE MEASUREMENT OF IRREGULAR AREAS

William R. Elkins, Port Wentworth, Ga.

Application November 23, 1955, Serial No. 548,698

8 Claims. (Cl. 33—121)

This invention relates to devices for the measurement of irregular areas, and more particularly to devices of this character wherein the area may be determined at a remote point by visual scanning. This invention is an improvement over the device for the same purpose disclosed in my prior Patent No. 2,681,509.

The primary object of the present invention is to provide a device of this character having an improved scanning means whereby the scanning members may more quickly and accurately be brought into coincidence with the visual image.

Another object is to provide improved means for accumulating the respective movements of the scanning members and obtaining a reading in square units of area, or in cubic units where standard lengths are involved.

A further object is the provision of means for quickly clearing the device after a measurement has been taken.

A still further object is the provision of means whereby a permanent record of the measurement may be made for future reference.

Other objects of the invention will become apparent from the following description of one practical embodiment thereof, when taken in conjunction with the drawings which accompany, and form part of, this specification.

In the drawings:

Figure 3 is a horizontal section, on an enlarged scale, showing the mounting for the scanning members, taken on the line 3—3 of Figure 1;

Figure 4 is a vertical section, taken on the line 4—4 of Figure 2, further illustrating the scanning member support and showing the means for urging the members into engagement with the actuating and accumulating gears;

Figure 5 is a section through the split nut which controls the movement of the pointer, taken on the line 5—5 of Figure 1;

Figure 6 is a detail section on the line 6—6 of Figure 1, and shows the gearing interconnecting the clearing operating racks;

Figure 7 is a diagram of the operating circuit; and,

Figure 1:
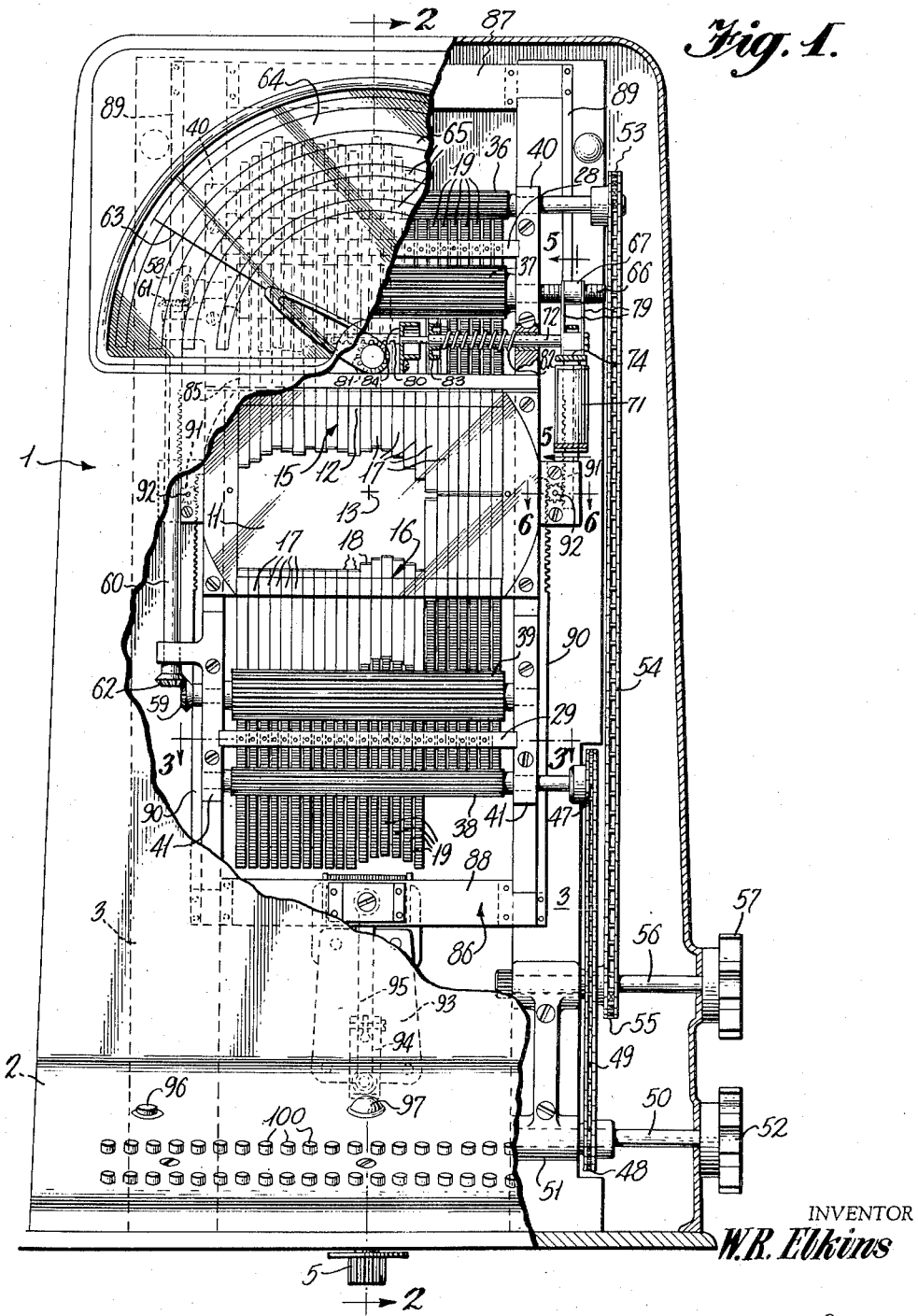
Figure 1 is a front elevation of a device embodying the principles of the present invention, parts of the casing being broken away to show the interior structure.

Prior Patent No. 2,681,509 discloses a device for measurement of irregular areas, wherein means are included for obtaining a visual image of the area to be measured. Movable scanning members may be operated to coincide with the periphery of the image and their movement operates an indicator to give the measurement. In general, the present invention concerns a similar device, but the scanning members, their mounting and operating means have been improved. Also, means have been included for making a permanent record of the measurement.

Referring to the drawings in detail, the device is shown as enclosed in a cabinet 1, mounted upon a base 2. Within the cabinet, vertical frame members 3 supported upon the base 2 serve as mounting members for all of the mechanism.

The device is mounted so as to be adjustable to permit levelling or matching the position of its image screen to the area to be measured. For this purpose, the base is provided at the center of its rear edge with a ball foot 4 which fits freely in a supporting cup 5 fixed to a table or other supporting stand. This will serve to fix the device with respect to an area to be measured which is at a known distance from the table. The ball will allow universal movement of the device. The front of the cabinet is provided with two threaded ears 6, one at either end, in which the threaded stems of adjustable feet 7 are mounted. Adjustment of the feet 7 can be made to cause the device to tilt in any desired direction about the ball foot 4.

The cabinet has a rearwardly extending hood 8 which houses an eye piece 9. Eye-piece 9 has a ball mounting 10 so that it can be moved for viewing all parts of the image screen 11, which is mounted between the frame members 3. The screen will be ground glass, and etched, as at 12, to delineate the limits of measureable area, and have a horizontal center line 13. The image is picked up by a lens 14, mounted in the front of the cabinet, and projected on the screen.

An upper set 15 of scanning bars and a lower set 16 are provided for cooperation with the screen to outline the image and determine the area. The bars 17 of both sets are identical, and only one need be described. Each bar has a scanning end 18, which is transparent and of a width chosen to represent a predetermined span of the area to be measured, and an operating end in the form of a rack 19 of less width than the scanning end. The tips of the scanning ends are made black for ease in setting to the image of the area to be measured. The scanning ends of the bars are of sufficient length to overlie one-half of the screen, and the bars of both sets are to meet at the center line 13 of the screen when the bars are in their inactive positions. The bars of each set are arranged side by side in edge contact so that a set will bridge the representative area to be scanned.

Frames 20 and 21 are supported horizontally between the vertical frames 3 to provide mountings for the two sets of scanning bars. As these frames are identical, only one will be described. Each frame comprises an upper support bracket 22 and a lower support bracket 23, the brackets being connected at their ends to the vertical frame members 3. The two brackets are spaced vertically and a plurality of dividers 24 are mounted between them. The dividers are spaced horizontally to form a plurality of guide tracks 25 to slidingly receive the rack ends of the scanning bars. Spacers 26, the thickness of the racks 19, are fitted between the dividers to determine the distance within the guide tracks that the racks can move. In other words, the spacers form bottoms for the tracks.

The scanner racks are normally held against the bottoms of the guide tracks by means of spring-biased rollers 27 mounted in bars 28 and 29 extending between the vertical frame members opposite the upper and lower scanning sets. The bars are provided with horizontal, square openings 30 to receive sliding plugs 31 and coil springs 32. The outer ends of the plugs are slotted, as at 33, to accommodate the toothed wheels 27. The bars 28 and 29 are also slotted, as at 35, to permit free sliding movement of the wheels. The springs pressing against the ends of the plugs will cause the wheels to engage the racks 19 and hold them tightly against the bottoms of the guide tracks. They will be held with sufficient friction to prevent their accidental movement.

Racks 19 are adapted to be moved outwardly in their tracks to engage elongated gears 36, 37, 38 and 39. The racks of the upper set may engage gears 36 and 37, and those of the lower set gears 38 and 39. These gears are mounted in bearing blocks 40 and 41 secured to the frame members 3. The peripheries of the gears are spaced slightly from the racks, when the racks are seated in the bottoms of the guide tracks in their inoperative positions. The racks are moved to engage the gears by push-rods 42 which are located between the dividers 24. It will be noted from Figure 2 that the spacers 26 are separated to provide a guiding passageway for the ends of the rods 42. The other ends of the rods are pivotally connected to a mid-point of levers 43, which are pivoted to the dividers at one end as at 44 and connected at their ends to the armatures 45 of solenoids 46. Due to the fact that the solenoids are of greater width than the racks 19, half of them are placed on the upper supporting brackets 22 of the supporting frame and the other half on the lower bracket 23. Therefore, alternate levers 43 extend in opposite directions. It will be obvious that energization of any solenoid 46 will draw in its armature and move the push-rod which is connected to it by means of the lever 43. The push-rod will move the rack from the bottom of the guide track and into contact with its actuator and accumulator gears.

The lower actuator gear 38 has its shaft extended and carries a sprocket 47, which is connected to a sprocket 48 by chain 49. Sprocket 48 is mounted on a shaft 50, journalled in a bearing 51, carried by the vertical frame 3. Shaft 50 extends out through the side of the cabinet and is provided with an operating knob 52. Actuator gear 36 also carries a sprocket 53, connected by chain 54 to a sprocket 55 on a shaft 56 also journalled in bearing 51. Shaft 56 carries an operating knob 57. It will be seen that operation of either knob will cause rotation of the actuator gear which it controls on longitudinal movement of any scanning bar of the particular set which has been brought into engagement with the gear.

As the racks of the scanning bars are brought into engagement with both an actuator gear and an accumulator gear, movement of a rack by the actuator gear will cause rotation of the companion accumulator gear. In order to get a complete area reading, it is necessary that the movement of all of the scanning bars of both sets be accumulated. The movement of all scanning bars in each set will result in movement of the accumulator for each set. To get a total reading, the two accumulators are interconnected so that movement of one results in similar movement of the other. To accomplish this, each accumulator has an extended shaft and the accumulators 37 and 39 carry bevel gears 58 and 59 respectively. A vertical shaft 60 is interposed between the gears 58 and 59 and journalled in the bearings 40 and 41. Bevel gears 61 and 62 are fixed to the ends of shaft 60 to mesh with the gears 58 and 59.

One of the accumulator gears is used to move an indicating hand 63 over the face of a dial 64 to provide a reading of the total movement of the scanning bars. The dial may have several scales 65, one indicating square unit area, and one or more indicating cubic unit volume for predetermined depths of the square unit area measured. The accumulator gear selected, as shown, the gear 37, will have its shaft extended, as at 66, and threaded. A split nut 67 is used for cooperation with the threaded shaft. The two halves 68 and 69 of the nut are carried by the armature 70 of a solenoid 71 which is supported by a shaft 72. The solenoid is attached to the shaft by means of a strap 73 which is secured to a bracket 74 carried by a sleeve 75 mounted on the shaft. The two halves of the nut are in the form of arms, each having an arcuate portion 76 seated on, and rotatable about, the sleeve 75. The two halves have arcuate, threaded end portions 77 to surround and ride on the threads of the shaft 72. A spring 78 normally holds the two halves on their seat and in engagement with the threaded shaft. The halves are connected to the armature by links 79, so that when the solenoid is actuated the nut halves will be rocked around the sleeve to withdraw the nut sections from engagement with the shaft.

Shaft 72 is slideably mounted in one of the bearing blocks 40, and as the split nut rides on the shaft 66 will move axially. The inner end of shaft 72 is formed as a rack 80 which is in mesh with a gear 81 connected to the indicator hand 63. Therefore, as the accumulator gears rotate, the shaft 72 will be moved inwardly and cause hand 63 to move across the dial.

A spring 82 is mounted around the shaft 72 and abuts the bearing block 40 and a piston 83 carried by the shaft 72. As the shaft is moved outwardly, the spring will be compressed and will force the shaft to its at rest position when the split nut is released from the threaded shaft 66. Piston 83 moves into a cylinder 84 on the return movement of the shaft, serving as a dashpot to cushion the shaft and prevent shock as the shaft reaches its limit of travel. The piston and cylinder act as a limit stop for the shaft. The cylinder may be mounted on the frame 85 which supports the image screen 11.

After a measurement has been taken, the scanning bars will be located in various positions with respect to the image screen. It is desirable to return them all to their positions of rest wherein all of the bars of both sets have their tips at the center line 13 of the image screen. A clearing mechanism 86 is provided for that purpose.

The clearing mechanism includes a pair of oppositely movable clearing bars 87 and 88, mounted one above the upper set of scanning bars for contact with the upper ends of the scanning bars and one below the lower ends of the lower set of scanning bars. The upper clearing bar 87 has downwardly extending racks 89 mounted at its ends, and the lower bar 88 has a matching pair of upstanding racks 90 connected to its ends. The racks are long enough so that the upper and lower racks overlap. Gears 91 are mounted on shafts 92 between the racks on each side of the device so that the gears are in mesh with the racks connected to both clearing bars. The racks are on opposite sides of the gears so that movement of one clearing bar will be transmitted through the gears to move the other clearing bar simultaneously but in an opposite direction. Thus, if the lower clearing bar is raised to contact the lower ends of the bottom scanning bars to push the scanning bars upward, the upper clearing bar will press downwardly upon the upper scanning bars. The clearing bars are moved by means of a motor 93 supported on the frame. The motor shaft carries a crank 94, and the crank is connected to the lower clearing bar by a pitman 95. The full throw of the crank is sufficient to move the clearing bars to shift all of the scanning bars to the center line of the image screen. A button 96 controls the operation of the motor which is of the type which makes one revolution and stops. A warning light 97 is provided on the cabinet to indicate when the clearing operation is in progress.

The various electrical parts of the machine may be connected in any desired manner. One way of connecting them is shown in Figure 7. The input and return wires 98 and 99 may be led into the device by the usual cord.

Figure 2:
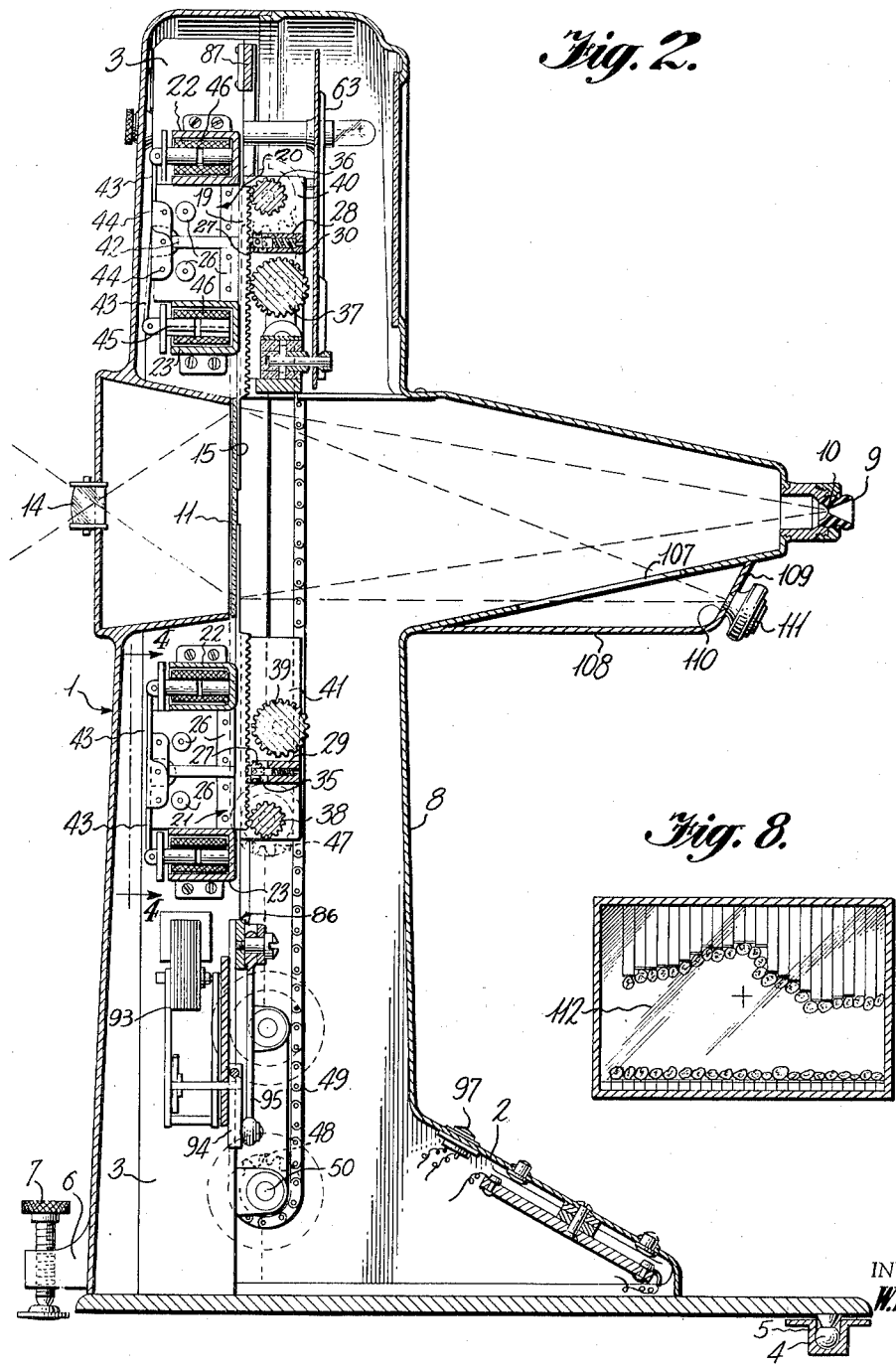
Figure 2 is a vertical section taken centrally through the device substantially on the line 2—2 of Figure 1.
Figure 8:
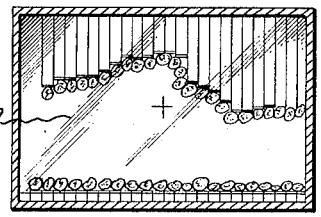
Figure 8 is a schematic view showing the position of the scanning bars relative to the image of the area to be measured.

The solenoids 46, which control engagement of the independent scanning bars with the actuator and accumulator gears, are controlled by buttons 100 arranged on the cabinet in two rows (see Figures 1 and 2). The buttons of the upper row control the scanning bars of the upper set, and those of the bottom row control the lower set. The buttons serve to close switches 101, each of which is connected to the input line by a wire 102 and to one of the solenoids 46 by a wire 103. The opposite ends of the solenoid coils are connected to the return line 99 by means of wire 104. In this way, whenever a button 100 is depressed a single solenoid will be actuated to move one scanning bar into engagement with its actuator and accumulator gears.

The motor 93, split-nut operating solenoid 71 and light 97 are connected in series so that all will be operated simultaneously. The button 96 energizes the motor, and the circuit is held closed by the motor until one complete revolution has been made, whereupon the circuit is broken. As the solenoid and light are in series with the motor, they will remain energized until the motor breaks the circuit. A wire 105 connects the motor to the input wire 98, and wire 106 connects the motor to the solenoid and light and the return line 99.

In order to be able to make a permanent record of the measurement, the hood 8 is provided with an opening 107 on the underside. To this is attached a closure member 108 having angularly related walls, the rear wall 109 having an opening 110 the projected axis of which intersects the center of the image screen 11. A camera 111 is mounted in the opening 110 with its lens focused on the screen 11. This will permit the taking of a picture of any image on the screen 11.

In using the device, it is first set up and the feet adjusted to level it and direct it toward the area to be measured. This area may be a load of cord wood, for instance, positioned at predetermined distance from the device. The side of the load will be toward the measuring device and its image can be seen on the screen 11, as at 112. The image will be seen through the transparent scanning ends of the scanning bars which will be positioned with their ends at the center line of the screen. The scanning ends of the bars will cover the entire screen with the bars of the two sets in end contact with one another. The width of each bar will represent a unit width relative to the reduced image on the screen.

The operator will then manipulate the device to bring the ends of the scanning bars into coincidence with the periphery of the load to be measured. By depressing each of the buttons 100 in turn each scanning bar will be put into engagement with its actuator and accumulator gear and can be adjusted by turning the knob 52 or knob 57 as the case may be. Each time a scanning bar is moved, the amount of movement will be reflected in movement of its accumulator gear. As the accumulator gears are interconnected, both will move in equal amounts whenever a bar is adjusted. Thus, all movement will be transmitted through the split nut 67 and so to the hand 63. The movement of the bars will be additive, and when the last bar has been moved the total will be registered by the hand on the dial. The area of the exposed face of the load will be shown in square units on one scale and, if the length of the sticks making up the load is known, the volume in cubic units, or in the case of wood in cords, will be indicated on another scale. After the adjustment has been made and the total noted, a picture may be taken with the camera 111 to make a permanent record.

The device is now ready to be reset to starting position. This is accomplished by pressing button 96 to energize motor 93 and solenoid 71 and to turn on the warning reset light 97. Solenoid 71 will actuate the split nut 67 releasing it from the threaded shaft 66. Spring 82 will force shaft 72 back to its starting position, placing the split nut adjacent the end of the threaded shaft 66 and returning the hand to zero. Piston 83 entering cylinder 84 will slow down the movement of the shaft and prevent shock. Upon de-energization of the solenoid, spring 78 will draw the halves of the split nut into engagement with the threaded shaft. While the shaft 72 is returning to its starting position, the motor will cause the clearing bars 87 and 88 to move in opposite directions to contact the ends of the scanning bars of the two sets and return the scanning bars to their original positions with their scanning ends at the centerline of the screen. The motor will cause the crank to make one revolution and stop with the two clearing bars at their outer limits of travel, leaving ample room for full adjustment of the scanning bars. During the clearing movement, the scanning bars will be free to move as none of them will be in contact with the actuator or accumulator gears. They will be held in position only by their frictional contact with the guide tracks in which they are seated.

While in the above one practical embodiment of the invention has been disclosed, it will be understood that the precise details of construction described and shown are merely by way of illustration, and the invention may take other forms within the scope of the appended claims.

What is claimed is:

1. In a device for measuring irregular areas, a housing, a viewing screen in said housing, two sets of scanning bars, each set having a plurality of bars arranged in edge to edge relationship in a single plane with the ends of the bars of the two sets in abutment on a horizontal plane including the center of the viewing screen when in their position of rest, said bars mounted in said housing for individual vertical movement, an operating gear extending transversely across each set of scanning bars, an accumulator gear extending transversely across each set of scanning bars, each of said bars including a rack section for meshing engagement with said operating and accumulator gears, means to normally hold said bars out of engagement with said gears, means to move individual bars into engagement with said gears, individual means to rotate said operating gears, means interconnecting said accumulator gears for simultaneous rotation, and means to register the total movement of said accumulator gears.

2. In a device for measuring irregular areas as claimed in claim 1, means to make a permanent record of the image on said viewing screen.

3. In a device for measuring irregular areas as claimed in claim 1, said means for registering the movement of the accumulator gears comprising, a dial, a hand movable over said dial, and means interconnecting said hand and one of said accumulator gears.

4. In a device for measuring irregular areas as claimed in claim 1, said means for registering the movement of the accumulator gears comprising, a dial, a hand movable over said dial and having a driving gear, a slidable rack in mesh with said hand driving gear and supporting a split nut on the opposite end thereof, and one of said accumulator gears having an extended threaded shaft with which said split nut is engageable.

5. In a device for measuring irregular areas as claimed in claim 4, means to release said split nut from said accumulator shaft, and spring means biasing said slidable rack towards its position of rest.

6. In a device for measuring irregular areas as claimed in claim 5, clearing bars at opposite ends of the scanning bar sets in the plane of said sets, and means to move said clearing bars toward and from one another.

7. In a device for measuring irregular areas as claimed in claim 1, means to reset said scanning bars to their position of rest after movement, and means to reset said registering means to zero position.

8. In a device for measuring a remote area, a frame, an image screen supported by said frame, a lens to focus a reduced image of the remote area on said screen, an eyepiece through which said screen may be viewed, an upper set of scanning bars in edge contact spanning the width of said screen and movable vertically over a portion of said screen, a lower set of scanning bars in edge contact spanning the width of said screen and movable over the remainder of said screen, an actuating member for each set of scanning bars whereby the bars of each set may be moved over said screen, means to normally hold said bars out of contact with said actuating members, means to move individual scanning bars into contact with an actuating member, and means to indicate the accumulated movement of all of said scanning bars comprising, an accumulator member for each set of scanning bars operated by movement of the scanning bars of the respective sets; means interconnecting the accumulator members for simultaneous and equal movement, a dial, a hand movable over said dial, and means interconnecting said hand and one of said accumulating members to cause movement of said hand in accordance with movement of said accumulator members.

References Cited in the file of this patent

UNITED STATES PATENTS

| 2,641,840 | Garriss | June 16, 1953 |
| 2,681,509 | Elkins | June 22, 1954 |

FOREIGN PATENTS

| 19,324 | Germany | Jan. 15, 1882 |